Figure 3:
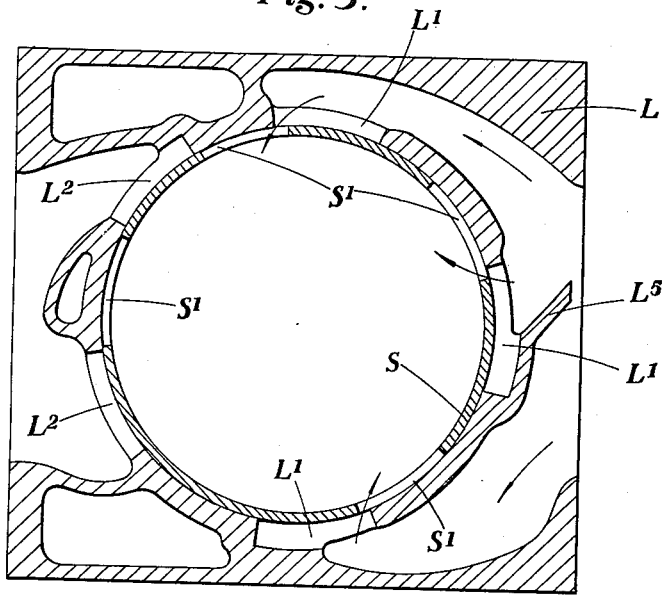

Dec. 22, 1936.                H. R. RICARDO                    2,065,025
              INTERNAL COMBUSTION ENGINE OF THE LIQUID
              FUEL INJECTION COMPRESSION IGNITION TYPE
                       Filed Sept. 8, 1932           2 Sheets-Sheet 1
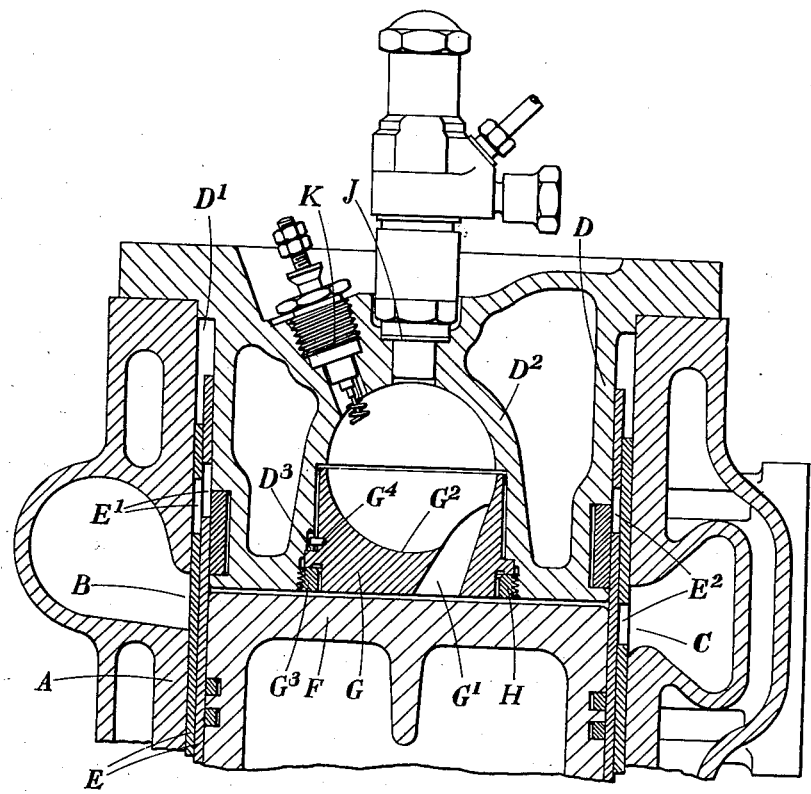
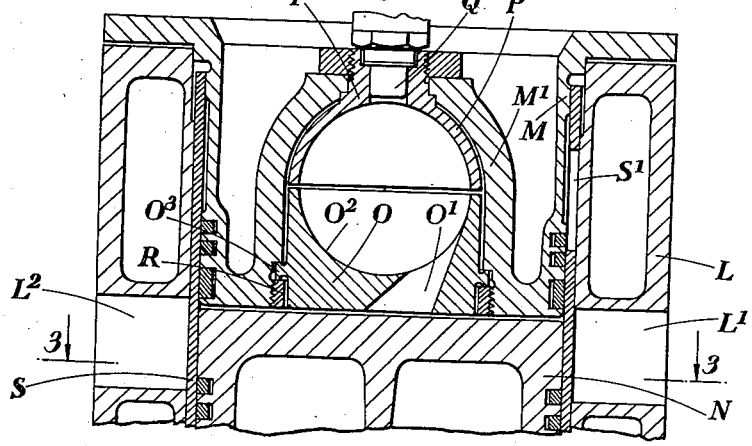

Dec. 22, 1936.  H. R. RICARDO  2,065,025
INTERNAL COMBUSTION ENGINE OF THE LIQUID
FUEL INJECTION COMPRESSION IGNITION TYPE
Filed Sept. 8, 1932  2 Sheets-Sheet 2

INVENTOR
Harry Ralph Ricardo
BY
Watson, Cole, Morse & Grindle
ATTORNEY

Patented Dec. 22, 1936

2,065,025

UNITED STATES PATENT OFFICE 2,065,025

INTERNAL COMBUSTION ENGINE OF THE LIQUID FUEL INJECTION COMPRESSION IGNITION TYPE

Harry Ralph Ricardo, London, England

Application September 8, 1932, Serial No. 632,252
In Great Britain September 25, 1931

2 Claims. (Cl. 123—32)

This invention relates to internal combustion engines of the liquid fuel injection compression ignition type in which substantially the whole of the air charge is forced at the end of the compression stroke through a constricted passage into a pocket-like combustion chamber in the cylinder head and has for its object to provide an improved engine of the above type.

To this end an internal combustion engine of the liquid fuel injection compression ignition type according to the present invention comprises a cylinder in which are formed inlet and exhaust ports, one or more sleeve valves within the cylinder controlling these ports, a water-cooled plug-like cylinder head extending within and closing one end of the cylinder and containing a water-cooled pocket having a mouth which opens into the cylinder, a plug which is disposed within this mouth and is so formed and arranged as to tend to attain and be maintained at a high temperature during the operation of the engine, a passage in the plug through which substantially the whole of the air charge is forced during the compression stroke into the combustion chamber constituted by the part of the interior of the pocket not occupied by the plug, this passage being so formed in the plug that at the end of the compression stroke the whole charge in the combustion chamber will be highly heated and in a state of rotation, the circumferential portion of this rotating charge sweeping across the inner end of the passage in the plug, and a fuel injection device adapted to deliver a jet of fuel towards a part of the hot surface across which the circumferential portion of the rotating air charge sweeps as it approaches the inner end of the said passage.

The pocket is conveniently of circular cross-section in planes at right angles to the cylinder axis and is coaxial with the cylinder bore, this pocket having a cylindrical mouth while the plug is formed externally cylindrical, the passage in the plug being asymmetrical and inclined to the axis of the cylinder bore so that the charge forced through the plug during the compression stroke will enter the pocket in such a manner as to set up the desired rotation therein.

The inlet and exhaust ports may either be controlled by a single sleeve or by two concentric sleeves and where a single sleeve is employed this valve may be of the kind having imparted to it a combined oscillating and reciprocating motion, means preferably being provided for reducing or eliminating the rotation of the air charge about the cylinder axis which tends to be set up owing to the manner in which such a sleeve controls the inlet port or ports. Where two concentric sleeves are employed on the other hand each of these sleeves conveniently has a reciprocating movement imparted to it.

In any case the form of the inner end of the pocket and of the inner end of the plug are preferably such that the combustion chamber is of substantially spherical or oval form the passage in the plug lying wholly to one side of the axis of the plug and being substantially tangential with respect to the part of the wall of the combustion chamber adjacent to which its inner end lies. The fuel injection device may be arranged coaxially with the pocket and cylinder bore.

Figure 4:
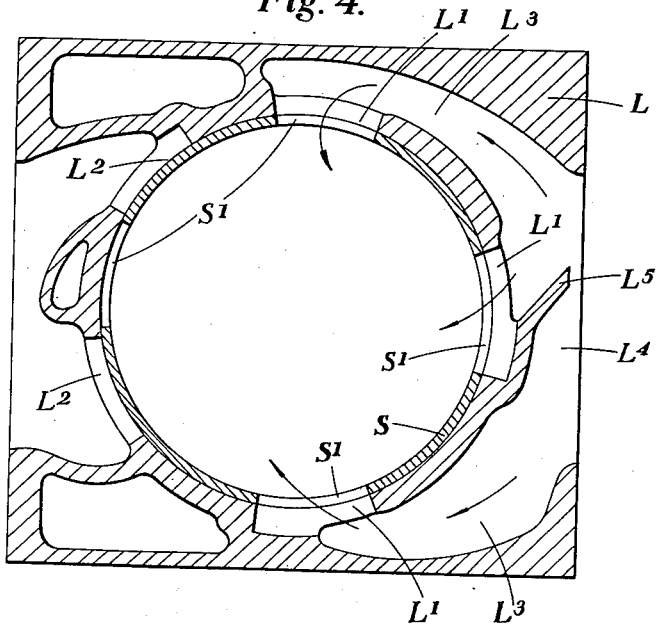

The invention may be carried into practice in various ways but two constructions according to this invention are illustrated by way of example in the accompanying drawings, in which Figure 1 is a sectional elevation of one construction, Figure 2 is a similar view to Figure 1 of an alternative construction, Figure 3 is a section on the line 3—3 of Figure 2 showing the sleeve valve in the position it occupies at the beginning of the induction period, and Figure 4 is a section on the line 3—3 of Figure 2 showing the sleeve valve in the position it occupies towards the end of the induction stroke.

In the construction illustrated in Figure 1 the engine comprises a water-cooled cylinder A provided with inlet and exhaust ports B, C in its wall and closed at its outer end by a water-cooled plug-like cylinder head D. Disposed concentrically one within the other in the cylinder are two sleeve valves E to each of which reciprocating movement is imparted in known manner, these valves being provided with inlet ports $E^1$ and exhaust ports $E^2$ and controlling the inlet and exhaust ports B and C, while their upper ends lie and move in an annular space $D^1$ between the circumferential wall of the plug-like cylinder head D and the inner wall of the outer end of the cylinder A. A piston F reciprocates within the inner sleeve valve E and approaches the cylinder head D closely at the end of its instroke.

Formed in the plug-like cylinder head D is a water-cooled pocket $D^2$ the mouth of which communicates with the cylinder bore and is, as shown, of generally cylindrical form, while its inner end is of substantially hemispherical form, the pocket being concentric with the cylinder bore. Loosely mounted within the mouth of the pocket is a plug G formed of heat-resisting material of low heat conductivity such as heat-resisting steel through which passes a restricted passage $G^1$, the inner end of the plug being formed with a substantially hemispherical recess $G^2$ so as to provide a substantially spherical combustion chamber between the inner end of the plug and the inner end of the pocket $D^2$, while the passage $G^1$ through the plug is so formed as shown that the air charge forced therethrough from the cylinder bore into the combustion chamber will enter the combustion chamber in a direction which is substantially tangential with respect to a circle having for centre the centre of the combustion chamber. The width of the gap between the outer circumferential surface of the plug and the inner circumferential surface of the pocket may be of the order of a hundredth of an inch.

The plug is conveniently held in place by an externally screwthreaded ring H of ductile metal engaging a corresponding screwthread in the mouth of the pocket and bearing on an external flange $G^3$ on the plug. A pin $G^4$ preferably extends radially from the outer cylindrical surface of the plug and engages a slot $D^3$ in the wall of the mouth of the pocket so as to prevent rotation of the plug within this mouth. The inner circumferential surface of the ring H is preferably separated from the wall of the plug by a small space of, say, one-hundredth of an inch and the ring H is preferably also so formed as to have as small an area in contact with the flange $G^3$ as is practicable.

A fuel injection device J is mounted in a bore in the inner domed end of the pocket $D^2$ and is adapted to deliver a jet of fuel towards a part of the concave inner surface of the plug lying adjacent to the axis of the pocket and immediately to the lefthand side of the inner end of the passage $G^1$ through the plug in the construction shown, the arrangement preferably being such that the jet of fuel will be directed towards a part of the inner surface of the plug lying as near to the inner end of the passage as is practicable while avoiding direct injection of any fuel into the passage. In some cases the rotary movement of the air in the combustion chamber may tend to deflect the fuel jet somewhat and in determining the correct disposition of the fuel sprayer to ensure the fuel being directed towards the required part it may be necessary to allow for such deflection.

An igniter K of the hot wire type to assist starting from cold is also preferably arranged in a bore in the domed inner end of the pocket.

The operation of the engine is as follows. Air is drawn in during the suction stroke through the inlet ports B, $E^1$ and during the compression stroke substantially the whole of this air charge is forced into the combustion chamber through the passage $G^1$ in the plug G in such a manner that at the end of the compression stroke the charge in the combustion chamber will be in a state of rapid rotation as a whole with the circumferential portions of this rotating air charge sweeping across the inner end of the passage $G^1$. Fuel is then injected by the sprayer J and impinges on the part of the inner surface of the plug immediately to the left of the inner end of the passage in the construction shown, i. e. the part of the surface of the plug across which the circumferential portions of the rotating air charge sweep immediately before they reach the inner end of the passage $G^1$. Preferably the part of the inner surface of the plug on which the fuel jet thus impinges lies as near to the inner end of the passage $G^1$ as is practicable while avoiding direct injection of any fuel into this passage.

Ignition then takes place and it will be seen that each part of the air charge as it comes into contact and ignites with the fuel impinging on the plug can as it expands pass substantially directly out of the pocket through the passage $G^1$ without driving before it any unburnt air. In this way efficient distribution of the fuel in the air and efficient combustion tends to be effected.

In the alternative construction illustrated in Figures 2, 3 and 4 the engine comprises a cylinder L having inlet and exhaust ports $L^1$, $L^2$ and closed at its outer end by a plug-like cylinder head M to which the piston N closely approaches at the end of its instroke. Formed in the plug-like cylinder head M is a water-cooled pocket $M^1$ having a cylindrical mouth opening into the cylinder, while its inner end is of substantially hemispherical form, the pocket being concentric with the cylinder bore. Loosely mounted within the mouth of the pocket is a plug O formed of heat-resisting material of low heat conductivity, such as heat-resisting steel, through which passes a restricted passage $O^1$, the inner end of the plug being formed with a substantially hemispherical recess $O^2$. The domed inner end of the pocket is provided with a heat-insulating liner P secured in place by a central boss $P^1$ through which passes the end of a fuel sprayer Q adapted to deliver a single concentrated jet of fuel towards the part of the inner concave surface $O^2$ of the plug lying immediately to the left of the inner end of the passage $O^1$ in the plug.

It will be seen that with the construction illustrated a substantially spherical combustion chamber is formed between the inner concave surface $O^2$ of the plug and the inner concave surface of the liner P, while the air charge forced through the passage $O^1$ from the cylinder bore into the combustion chamber will enter this chamber in a direction which is substantially tangential with respect to a circle having for centre the centre of the combustion chamber, whereby this charge will be caused to rotate as a whole within the combustion chamber with the circumferential portions of the rotating air charge sweeping across the inner end of the passage.

The plug is conveniently held in place by an externally screwthreaded ring R of ductile metal engaging a corresponding screw thread in the mouth of the pocket and bearing on an external flange $O^3$ on the plug.

The gap between the inner surface of the pocket $M^1$ and the outer surfaces of the plug O and of the liner P may vary but is preferably of the order of one-hundredth of an inch while a corresponding gap is preferably left between the inner surface of the ductile metal ring R and the outer surface of the plug.

Disposed within the cylinder is a single sleeve valve S having ports $S^1$ cooperating with the inlet and exhaust ports $L^1$, $L^2$, this sleeve having imparted to it in known manner a combined oscillating and reciprocating movement so as to control the inlet and exhaust ports, the arrangement being such that the movement of the sleeve is mainly oscillatory during the induction period. As shown in Figures 3 and 4, the inlet ports $L^1$ communicate with an induction belt $L^3$ formed in the cylinder having an inlet opening L⁴ and the centre one of the three inlet ports L¹ has arranged to one side thereof a guide plate L⁵ arranged as shown.

With this construction during the initial part of the induction period owing to the manner in which the valve opens the inlet ports the charge tends to enter the cylinder tangentially in the direction indicated by the arrows in Figure 3, and thus tends to cause rotation of the charge within the cylinder in an anti-clockwise direction, and normally in engines having sleeve valves of the kind in question, this rotation is maintained so that the whole charge at the end of the induction period and during the compression stroke is in a state of rapid rotation which tends to cause rapid transference of heat to the cylinder walls. In the arrangement according to the present invention, however, it will be seen that owing to the formation of the induction belt and the provision of the guide plate L⁵ the charge is caused to approach the inlet ports in such a manner that when these ports are open to a substantial extent, as during the centre part of the induction period, the charge tends to flow through these ports in a tangential direction opposite to that in which it flows through the ports during the initial part of the induction period, as indicated in Figure 4. In this way the rotation of the charge which tends to be set up during the initial part of the induction period is checked by reason of the manner in which the charge enters the cylinder during the middle and later parts of the induction period so that at the end of the induction period there is little or no rotation of the charge in the cylinder.

It will be seen that with each of the constructions illustrated, owing to the fact that the plug is loosely mounted within the mouth of the pocket, the transmission of heat from the plug to the cooled walls surrounding it is small, whereby the plug is caused to attain and be maintained at a high temperature during operation of the engine. This results not only in efficient operation but ensures prompt ignition of the first portion of the fuel injected, whereby the rate of burning and hence of pressure rise can readily be controlled during substantially the whole fuel injection period by controlling the rate of injection of the fuel. In this way smooth and flexible operation of the engine can be attained. Further, since the combustion chamber pocket is water-cooled, the heat stresses in the metal walls of this pocket can readily be maintained within safe limits.

What I claim as my invention and desire to secure by Letters Patent is:—

1. An internal combustion engine of the liquid fuel injection compression ignition type including in combination a cylinder having inlet and exhaust openings in its wall, a sleeve valve disposed within the cylinder and having ports therein adapted to register with the inlet and outlet openings respectively during the inlet and exhaust periods, means for imparting to the sleeve a motion such that the inlet ports commence to register with the inlet openings when the motion of the sleeve is mainly oscillatory, means for leading the charge through the inlet openings in such a direction as to counteract at least partially the rotation of the charge about the cylinder axis which tends to be produced during the initial opening period of the inlet ports, a combustion chamber having restricted communication with said cylinder into which substantially the whole of the air charge is forced during the compression stroke, communication between the cylinder and combustion chamber being sufficiently restricted to nullify the effect of rotational movement of the charge during passage of the charge into the combustion chamber, and a heated plug associated with the combustion chamber for materially raising the temperature of the compressed charge.

2. An internal combustion engine of the liquid fuel injection compression ignition type including, in combination, a cylinder having inlet and exhaust openings in its wall, a sleeve valve disposed within the cylinder and having ports therein adapted to register with the inlet and outlet openings respectively during the inlet and exhaust periods, means for imparting to the sleeve a combined oscillating and reciprocating motion such that the inlet ports commence to register with the inlet openings when the motion of the sleeve is mainly oscillatory, means for leading the charge through the inlet openings in such a direction as to counteract at least partially the rotation of the charge about the cylinder axis which tends to be produced during the initial opening period of the inlet ports, a combustion chamber having restricted communication with said cylinder, communication between the cylinder and combustion chamber being sufficiently restricted to nullify the effect of rotational movement about the cylinder axis of the charge forced into the combustion chamber, and a heated plug associated with the combustion chamber for materially raising the temperature of the compressed charge.

HARRY RALPH RICARDO.